United States Patent [19]
Grundy

[11] 3,818,463
[45] June 18, 1974

[54] SEMICONDUCTOR INFORMATION STORAGE DEVICES

[75] Inventor: David Latham Grundy, Saddleworth, England

[73] Assignee: Ferranti Limited, Hollinwood, England

[22] Filed: June 8, 1973

[21] Appl. No.: 368,106

Related U.S. Application Data

[63] Continuation of Ser. No. 208,330, Dec. 15, 1971, abandoned.

[52] U.S. Cl. .......... 340/173 CA, 307/238, 307/279, 340/173 R

[51] Int. Cl. ........................ G11c 11/40, G11c 11/24

[58] Field of Search ......... 307/238, 279; 340/173 R, 340/173 CA

[56] References Cited

UNITED STATES PATENTS 3,387,286 6/1968 Dennard ............................ 340/173

*Primary Examiner*—Terrell W. Fears
*Attorney, Agent, or Firm*—Edward J. Kondracki

[57] ABSTRACT

A cell of a monolithic semiconductor memory store comprises a bi-directional bipolar transistor with a capacitance connected to the collector, for example, a collector-diffusion-isolation transistor, there being associated with the cell, writing means which either charges the capacitance or not when the transistor is capable of conducting in the reverse direction, and reading means which produces an output indicative of whether or not the capacitance is charged.

16 Claims, 7 Drawing Figures

SEMICONDUCTOR INFORMATION STORAGE DEVICES

Figure 1:
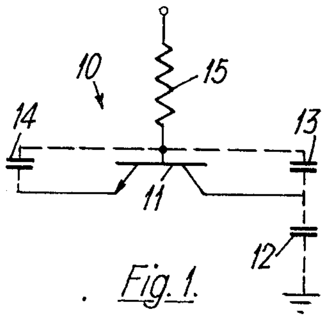

This is a continuation of Ser. No. 208,330, filed Dec. 15, 1971, now abandoned.

This invention relates to semiconductor information storage devices.

It is an object of the present invention to provide a semiconductor information storage device of a novel and advantageous construction.

According to the present invention a semiconductor information storage device has a plurality of cells each to store an information bit, each cell comprising a bipolar transistor capable of conducting in both the forward and the reverse directions, the transistor having a significant current gain factor in both directions, and a capacitance connected to the collector of the transistor, there being associated with the cell, writing means to charge the capacitance with the transistor conducting in the reverse direction, and reading means to provide an output indicative of whether the capacitance is charged or not.

In this specification the terms "collector" and "emitter" are used to refer to the collector and emitter of a bi-directional transistor when capable of conducting in the forward direction.

When the transistor is capable of conducting in the reverse direction, the writing means either charges the capacitance or not in order to write into the cell the information bit to be stored. The output of the reading means is representative of the information bit stored in the cell by indicating whether or not the capacitance is charged.

There may be associated with each cell switching means arranged to connect either the writing means or the reading means to the cell.

Means may also be provided to raise the base potential level of the transistor to a value at which the transistor is capable of conducting in either direction, and the switching means connects either the writing means or the reading means to the emitter of the transistor.

The transistor may be arranged to conduct in the forward direction to discharge the capacitance, when the capacitance is charged, and the reading means is connected to the emitter of the transistor.

Each cell may be formed in a semiconductor body comprising an epitaxial layer of one conductivity type on a substrate of the same conductivity type, the bidirectional transistor of the cell having a collector of the opposite conductivity type comprising both a heavily doped isolation barrier for the transistor and a heavily doped buried layer at the interface between the epitaxial layer and the substrate, the isolation barrier extending through the epitaxial layer into contact with the buried layer, and the capacitance of the cell being provided by the P-N junction between the collector and parts of the semiconductor body around the collector and remote from the base. Thus, the transistor comprises a so-called collector-diffusion-isolation transistor.

The plurality of cells of the storage device may be formed in a single semiconductor body. Other parts of the storage device, for example, the writing means and the reading means, also may be formed in the semiconductor body.

Figure 2:
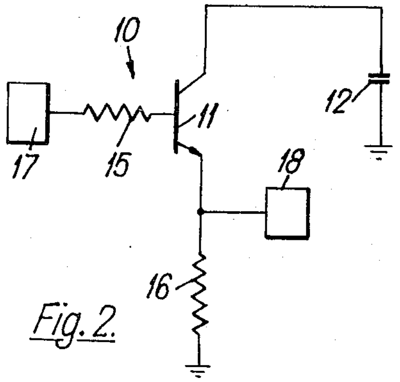
Figure 3:
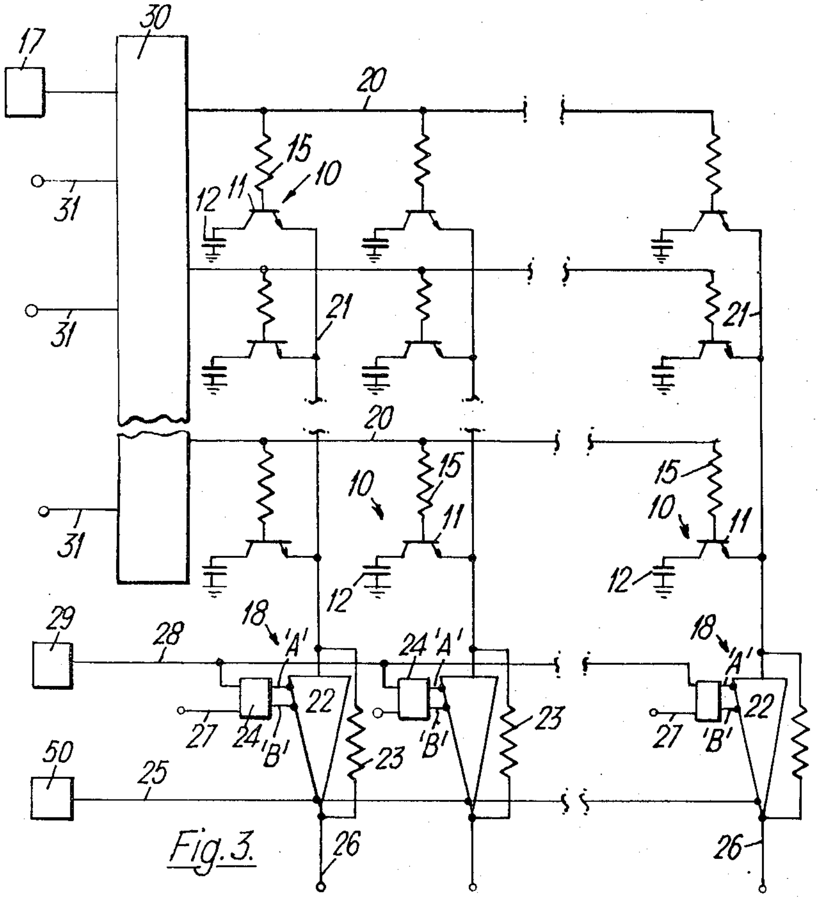
Figure 4:
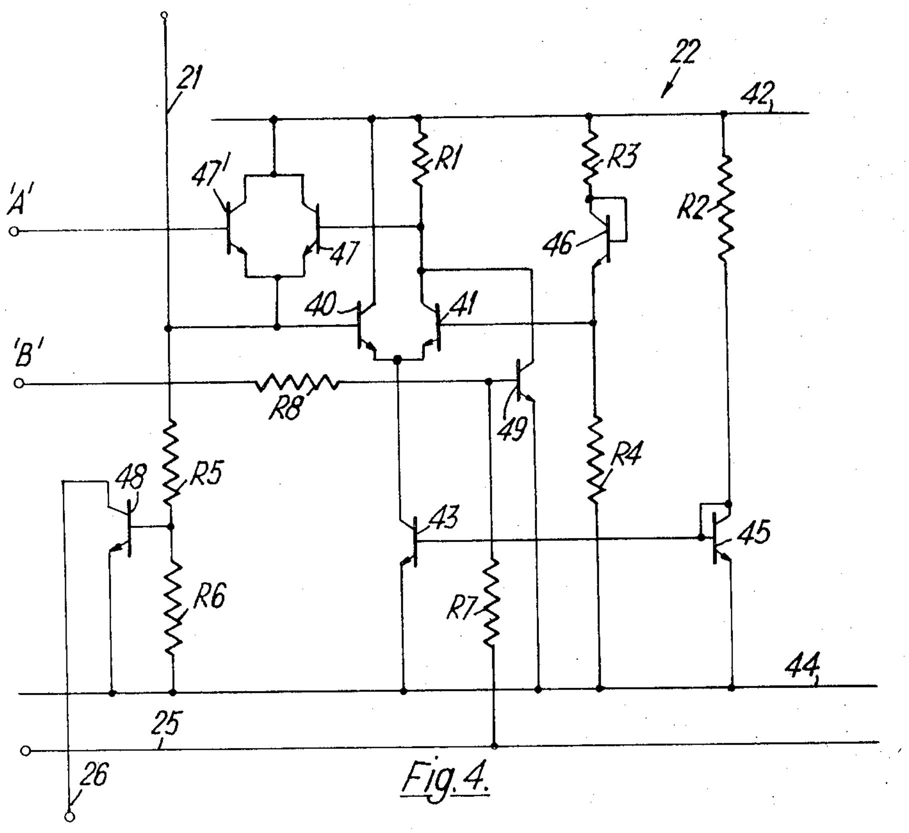
Figure 5:
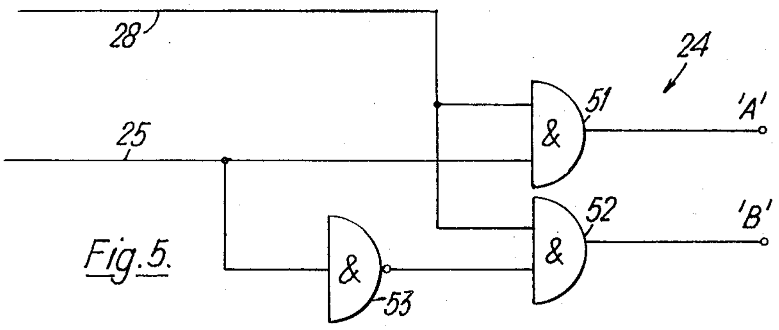
Figure 6:
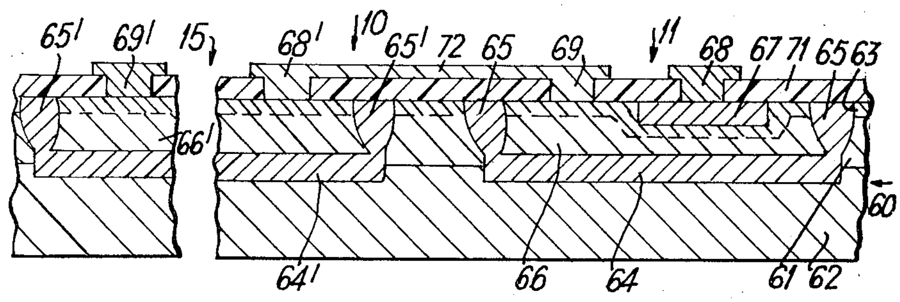
Figure 7:
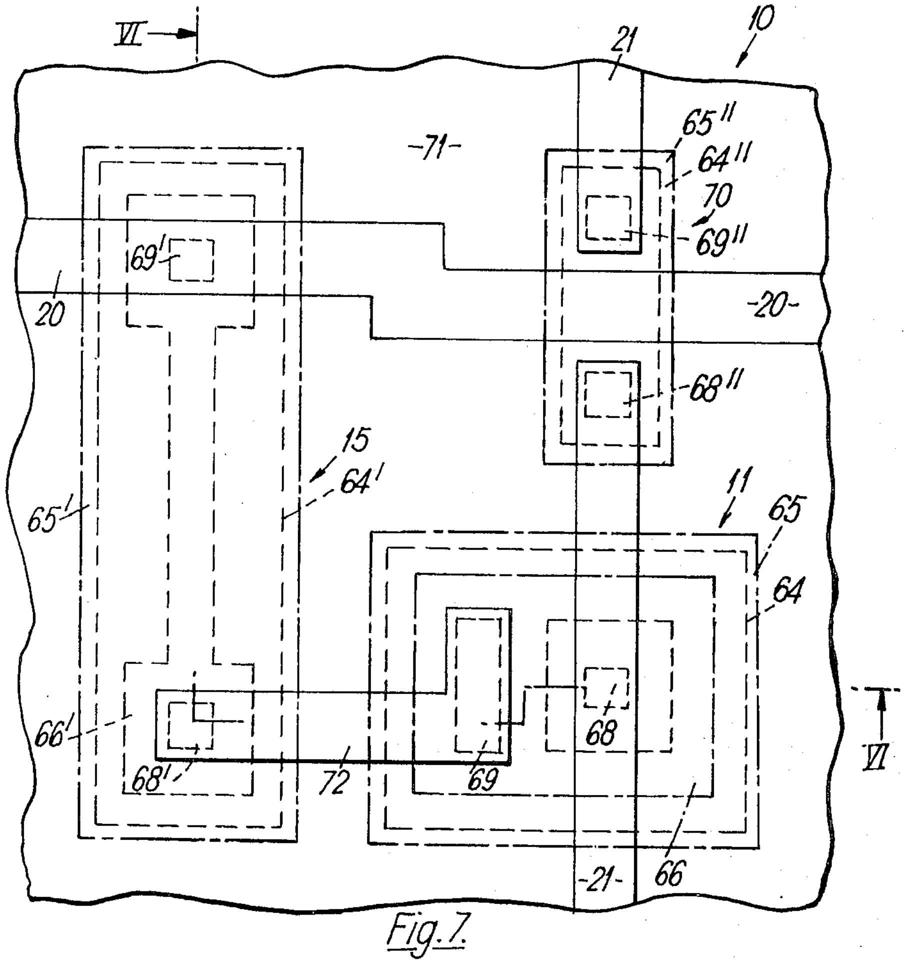

The present invention will now be described by way of example with reference to the accompanying drawings, in which FIG. 1 is a circuit diagram representing one embodiment of a cell of an array of cells comprising a semiconductor information storage device, FIG. 2 is a simplification of the circuit diagram of FIG. 1, FIG. 3 shows schematically the arrangement of an 8 × 8 array of cells of FIG. 2 in a semiconductor information storage device, FIG. 4 is a circuit diagram of a writing/sensing amplifier associated with each cell in a column of cells of the array of FIG. 3, FIG. 5 is a logic circuit diagram of gating means associated with the writing/sensing amplifier of FIG. 4, FIG. 6 is a section on the line VI—VI of FIG. 7, and is of the cell of FIG. 2 when embodied in a semiconductor body, and FIG. 7 is a schematic plan view of the cell within the semiconductor body.

The illustrated cell 10 of an information storage device in a semiconductor body comprises a bipolar, collector-diffusion-isolation, N-P-N transistor 11 having a low resistivity collector and a low resistivity emitter, providing a transistor with a significant current gain factor in both the forward and the reverse directions. The transistor 11 is provided in a semiconductor body in a manner described in greater detail below with reference to FIGS. 6 and 7. The capacitance within the cell is indicated in FIG. 1 by a capacitance 12 provided by the P-N junction between the collector and parts of the semiconductor body around the collector and remote from the base, a capacitance 13 provided by the P-N junction between the base and the collector, and a capacitance 14 provided by the P-N junction between the base and the emitter. An isolating resistor 15 is connected to the base of the transistor. The capacitance 14, and particularly the capacitance 13, are required to be as small as possible for the cell to operate in a desirable manner. The capacitance 12 is required to be as large as possible in order to store as much charge as possible in the cell 10. The capacitance 12 may be considered as having one equivalent electrode connected to the collector of the transistor 11. The other equivalent electrode of the capacitance 12 may be considered as being within the substrate of the transistor, an during normal operation of the storage device is maintained at the highest negative potential level associated with the device, and is indicated in the Figure as being at zero potential.

The arrangement of the cell 10 also may be represented by the circuit diagram of FIG. 2, in which arrangement only the capacitance 12 is indicated, together with the isolating resistor 15 connected to the base of the transistor. Also illustrated, and associated with the cell, is a resistor 16 connected between the emitter and a point maintained at zero potential, address enable means 17 to raise the base potential level of the transistor from a low positive value to a high positive value, to render the transistor capable of conducting in either the forward or the reverse directions, and writing/sensing means 18. The writing/sensing means 18 is arranged either to charge the capacitance 12 with the transistor conducting in the reverse direction, or to discharge the capacitance 12, when it is charged, with the transistor conducting in the forward direction.

The arrangement is such that a "1" bit of information is stored in each cell when the capacitance 12 of the cell 10 is charged, it being considered that a "0" bit of information is stored in the cell when the capacitance is not charged; although the alternative arrangement is possible. Thus, it may be considered that only a "1" is to be written into the cell 10, the cell merely remaining uncharged when a "0" is to be written into the cell. When the information bit stored in the cell is to be changed it is not necessary to employ an erasure procedure, to arrange that the capacitance of the cell is discharged positively, because the normal leakage rate of the charge of the capacitance is high enough to ensure that the capacitance is sufficiently discharged when the re-writing step is performed. When a "1" is stored in the cell it is necessary periodically to re-charge the capacitance because of the charge leakage from the cell.

The schematic arrangement of a semiconductor information storage device according to the present invention and having an 8 × 8 array of cells 10 of FIG. 2 is shown in FIG. 3, for convenience only part of three columns and three rows of the array of cells being illustrated. Associated with each row of cells is an address line 20, different address lines 20 being provided for each individual row of the array. Associated with each column of cells is a write/sense line 21, different write/-sense lines 21 being provided for each individual column of the array. Writing/sensing means 18 are connected to each write/sense line 21, different writing/s-ensing means 18 provided for different write/sense lines 21. Each writing/sensing means 18 comprises an amplifier 22 with positive feedback, a resistor 23 being illustrated as being in parallel with the amplifier. The amplifier 22 also is connected to gating means indicated generally at 24, and to a reset line 25 common to each writing/sensing means 18 of the storage device. The amplifier 22 is provided with a data output line 26. Each gating means 24 is connected to the reset line 25, to a data input line 27, and to a write enable line 28 common to each gating means 24 of the storage device. The write enable line 28 is connected to write enable means 29.

The eight address lines of the storage device are connected to decoding means 30. The address enable means 17 and three input lines 31 are also connected to the decoding means 30, there being eight different possible combinations of signals on the three input lines 31. Each different combination on the three input lines 31 causes a different one of the eight address lines 20 to be selected, by causing the potential level of the address line to be raised, by selectively connecting the address line to the write enable means 17. Thus, the potential level of the base of each transistor 11 connected to the selected address line is raised from a low positive value to a high positive value. Hence, each transistor 11 connected to the selected address line 20 is rendered capable of conducting in either the forward or the reverse directions by the address enable means 17.

When a row of the array is addressed, the information bit stored in each cell 10 of the row normally is read by reading means, except when switching means, comprising the write enable means 29, causes writing means to over-ride the rending means.

The reading means is required to discriminate between the presence or the absence of a small transient signal on the write/sense line 21. Such a transient signal is produced when a "1" is stored in the cell and the capacitance 12 of the cell is discharged into an impedance, with the transistor of the cell conducting in the forward direction.

The reading means comprises the amplifier 22 having positive feedback, the amplifier 22 being arranged to raise the potential level of the transient signal and also to act as a temporary store, being capable of being latched in either of two possible stable states. Normally the amplifier is in a stable state indicative of a "0" being stored in the cell, but when a transient signal is detected on the associated write/sense line 21 the amplifier is transferred to the other stable state, and remains in this other stable state until reset by a pulse on the reset line 25. The signal representative of the "1" or the "0" stored in the cell is provided on the data output line 26.

The circuit diagram of each amplifier 22 is shown in FIG. 4. The amplifier is a differential amplifier and has a long-tailed pair of transistors 40 and 41. The collector of the first transistor 40 is connected directly to a supply rail 42, and the collector of the second transistor 41 is connected via a collector load resistor R1 to the supply rail 42. The emitter current of the pair of transistors 40 and 41 is provided by a current mirroring arrangement comprising a transistor 43 connected to a point between the emitters of the pair of transistors 40 and 41 and a rail 44 at zero potential, and a combination of a transistor 45 and a current defining resistor R2 in series with each other between the supply rail 42 and the rail 44, the bases of the transistors 43 and 45 being connected together. The base and the collector of the transistor 45 are connected together. The sense/write line 21 is connected to the base of the first transistor 40 of the pair of transistors, and a reference potential is applied to the base of the second transistor 41, the reference potential being established by a potential divider comprising a resistor R3, a transistor 46 and a resistor R4 in series between the rails 42 and 44. The base and the collector of the transistor 46 are connected together.

The feedback of the amplifier 22 is provided by a transistor 47 comprising an emitter follower of the first transistor 40. The feedback transistor 47 is connected between the rail 42 and the base of the first transistor 40. The base of the feedback transistor 47 is connected to a point between the collector and the collector load resistor R1 of the second transistor 41. When the second transistor 41 is switched ON the feedback transistor 47 is conducting to apply a pre-bias potential to the base of the first transistor 40, which pre-bias is less than the reference potential applied by the potential divider to the base of the second transistor 41. Hence, the first transistor 40 is switched OFF.

The current defining resistor R2 and the collector load resistor R1 of the second transistor 41 are equal in magnitude and, hence, the collector voltage of the second transistor is virtually independent of the voltage of the supply rail 42.

When one of the cells 12 connected to the amplifier 22 is addressed, and the capacitance 12 is not charged, no transient signal is produced on the write/sense line 21 and the first transistor 40 remains switched OFF. No output signal is produced on the data output line 26, indicating that a "0" is stored in the cell. However, if the capacitance 12 is charged the amplitude of the transient signal on the write/sense line 21 plus the pre-bias potential is greater than the reference potential. Thus, the first transistor 40 is switched ON, and the second transistor 41 is switched OFF. The first transistor 40 is latched ON by the feedback transistor 47 being latched ON, the potential level of the base of the feedback transistor 47 rising when the second transistor is switched OFF. The write/sense line 21 is thus maintained at the high potential level and an output transistor 48, connected via a resistor R5 to the write/sense line 21, is switched ON, producing a pulse on the data output line 26 of the amplifier 22, indicating that a "1" is stored in the cell. A resistor R6 is provided between the base of the output transistor 48 and the rail 44.

Although the capacitance 12 is discharged when reading a "1" from the cell, the positive feedback of the amplifier causes the charge to be restored in the cell before the amplifier is reset.

Discrimination between when a transient signal is present on the write/sense line 21, or not, is increased by the stray capacitance on the write/sense line. This stray capacitance is charged temporarily by the transient signal, and thus extends the duration of the signal, although also reducing its amplitude.

Discrimination is also increased by the parasitic P-N-P transistor action employing the substrate under the cell 10. Thus, when the cell is addressed, and is not charged, some of the base drive is diverted to the substrate.

The transistors 40, 47 and 48 remain switched ON until it is required to write an information bit into the cell. A pulse then is applied on the reset line 25, from reset means 50, via a resistor R7, to the base of a transistor 49, the transistor 49 being connected between the collector of the second transistor 41 and the rail 44. The reset pulse causes the transistor 49 to be switched ON, which in turn causes the transistor 47 to apply only the pre-bias potential to the base of the first transistor 40. Hence, the transistor 40 and 48 are switched OFF: and the second transistor 41 is switched ON, and remains ON.

Each gating means 24 connected between a data input line 27 and an amplifier 22 comprises, as shown in FIG. 5, a pair of two-input AND gates 51 and 52. Each AND gate is connected to the write enable means 29, via the line 28. One AND gate 51 also is connected directly to the data input line 27, and the other AND gate 52 is connected to the data input line 27 via an inverter indicated as NAND gate 53. Hence, irrespective of the potential level of the data input line 27, a high potential level is applied to only one of the AND gates by the data input line. An output 'A' of the gating means 24 comprises the output of the AND gate 51, and an output 'B' of the gating means 24 comprises the output of the AND gate 52. The potential level of the output 'A' is raised, when a "1" is to be written into a cell by raising the potential level both of the write enable line 28 and the data input line 27. The potential level of the output 'B' is raised, when a "0" is to be written into a cell by raising the potential level of the write enable line 28 and lowering the potential level of the data input line 27.

When the potential level of the output 'A' of the gating means 24 is raised, the base of a transistor 47', shown in FIG. 4, is raised to switch ON this transistor. The transistor 47' is connected between the supply rail 42 and the base on the first transistor 40, and when switched ON causes the first transistor to be switched ON. Hence, the second transistor 41 is switched OFF and the first transistor 40 is latched ON, the base potential level of the transistor 47 rising. Thus, the potential level of the write/sense line 21 is raised to cause the capacitance 12 of the addressed cell to be charged, to write a "1" into the cell. The potential level of the output 'A' of the gating means 24 is raised for the duration of a pulse from the write enable means 29. Subsequently, the first transistor 40 is switched OFF, and the second transistor 41 is switched ON, by applying a reset pulse on the line 25 to the transistor 49.

When the potential level of the output 'B' of the gating means 24 is raised the potential level of the base of the transistor 49 is raised, switching ON this transistor. Thus, if the second transistor 41 is not already switched ON, it will be switched ON. The capacitance 12 of the addressed cell will not be charged, indicative of a "0" being written into the cell.

To restore the information bit in a cell the cell is merely addressed, and the information bit is read from the cell. Hence, if a "1" is stored in the cell the capacitance is recharged by the feedback of the amplifier 22 before the first transistor 40 is switched OFF and the second transistor 41 is switched ON. If a "0" is stored in the cell the capacitance merely remains uncharged.

The amount of charge stored in a capacitance 12 is required to be above a predetermined threshold value in order that, when it is discharged, the transient pulse produced on the write/sense line 21 is discriminated by the amplifier 22. The magnitude of the predetermined threshold value is determined by the operating characteristics of the amplifier 22. Because of cells of the array of cells are addressed by rows, the charge of the charged capacitances is restored by rows also. The address means 17, thus, may comprise combinations of the signals on the input lines 31 of the decoding means 30 are repeated in sequence, at the clock frequency rate. Hence, the potential level of each address line 20 is raised at a rate of one-eighth of the clock pulse frequency. It may not be necessary to restore the charge in the charged capacitances if the application of the semiconductor information storage device is employed in an application which does not require the charge to be restored.

As shown in FIGS. 6 and 7, the cell 10 is fabricated by a known method, FIG. 7 comprises a schematic plan view of the cell, and FIG. 6 comprising a section of the cell showing the transistor 11 and the isolating resistor 15 connected to the base of the transistor.

The cell 10 is formed in a silicon semiconductor body 60, indicated in FIG. 6, and comprising a shallow P-type epitaxial layer 61 on a P-type substrate 62, the exposed surface portion 63 of the epitaxial layer 61 being on P+ type and being formed by a non-selective diffusion step. The transistor 11 of the cell 10 has the so-called collector-diffusion-isolation structure with a collector comprising both a buried N+ type layer 64 at the interface between the epitaxial layer 61 and the substrate 62 and an N+ type isolation barrier 65. The isolation barrier 65 extends through the epitaxial layer 61 into contact with the buried layer 64. The collector 64, 65 defines a P+ type base region 66 within the epitaxial layer 61. An N+ type emitter 67 is formed by the selective diffusion of a suitable impurity into the base region 66. Contacts 68 and 69 are provided, respectively, for the emitter 67 and base 66 profile in plan view of the transistor 11, is formed simultaneously with and in exactly that no region corresponding to the emitter 67 is provided. The resistive channel 66' is defined in the epitaxial layer 61 by an N+ type structure comprising a buried layer 64' and an isolation barrier 65' extending through the epitaxial layer 61 into contact with the buried layer 64'. Contacts 68' and 69' are provided at each end of the resistive channel 66'. The cell 10 also includes a cross-under 70 shown only in FIG. 7. This cross-under 70 is also formed simultaneously with the transistor 11, and closely resembles the resistor 15 except that a conductive channel is provided by a buried layer 64'' and by a region corresponding to an isolation barrier 65'' but extending through the epitaxial layer 61 into contact with the whole of the buried layer 64''. Contacts 68'' and 69'' are provided to opposing sides of the isolation barrier 65''.

A silicon oxide layer 71 is formed on the otherwise exposed surface of the epitaxial layer 61, and is employed as a diffusion-resistant material during the manufacture of the cell 10. The silicon oxide layer 71 is then retained on the surface, and for passivation purposes covers at least the otherwise exposed surface portions of the P-N junctions within the cell. The contacts extend through apertures in the silicon oxide layer 71.

All the cells of the regular, rectangular array of cells of the information storage device are fabricated simultaneously in the semiconductor body and other parts of the information storage device, for example, the decoding means 30 and the sensing/writing means 18, also may be fabricated in the same semiconductor body 60. The transistors and other components, such as resistors, of these other parts of the information storage device may have substantially the same construction as the collector-diffusion-isolation transistors 11 of the cells 10, and as described above with reference to FIG. 6. Hence, the whole of the storage device easily may be fabricated in the same semiconductor wafer body 60.

The required electrical interconnections within and between the cells 10, between the cells and the other parts of the storage device, and within the other parts, are provided by aluminum conductors extending on the silicon oxide layer 71 on the semiconductor body 60, the conductors extending between the appropriate contacts formed on the body. Thus, as shown in FIG. 7, the conductors associated with each cell 10 comprise the address line 20 extending from the resistor contact 69' of the cell to resistor contacts 69' of adjacent cells in the same row of the array and to the decoding means 21, the write/sense line 21 extending from the emitter contact 68 of the cell to emitter contacts 68 of adjacent cells in the same column of the array and to the associated writing/sensing means 18, and a conductor 72 between the base contact 69 and the resistor contact 68'. The write/sense line 21 crosses under the address line 20 employing the cross-under 70.

The capacitance 12 of the transistor 11 and indicated in FIGS. 1, 2 and 3, is provided by the P-N junction between the collector 64, 65 and the parts of the semiconductor body 60 around the collector and remote from the base 66. The capacitance 12 is required to be as large as possible in order that the amount of charge stored in the cell is as large as possible. The non-selective P+ type portion 63 of the epitaxial layer 61 enhances this capacitance 12, and hence the transistor 11 is spaced from the resistor 15 and the cross-under 70. The part of the capacitance between the buried layer 64 and the substrate 62 is increased by providing a heavily doped substrate. Thus, the equivalent electrode of the capacitance 12 connected to the collector can be considered as being provided within the buried layer 64. The other equivalent electrode of the capacitance of the cell can be considered as being provided within the substrate 62, and hence is maintained at the highest negative potential level associated with the device. It is required that the capacitance 14 associated with the base-emitter P-N junction, and particularly the capacitance 13 associated with the collector base P-N junction, should be as small as possible in order that the transistor 11 has desirable operating characteristics.

Charge leakage rate from the capacitance 12 is decreased by having a heavily doped substrate 62.

The provision of the non-selective P+ type portion 63 of the epitaxial layer 61 may be omitted, but this portion 63, in addition to enhancing the capacitance 12, helps to stabilise the resistors of the storage device, helps in preventing surface inversion, and causes the gain bandwidth product of the transistors to be increased.

Within the information storage device, all switching transistor, and all transistors except emitter followers and current sources, are provided with an additional emitter which is shorted to the base of the transistor. Thus, when each of these transistors is saturated the amount of charge stored in the base region is reduced, reducing the switching delay associated with the transistor. Very little charge is stored in the collector of a collector-diffusion-isolation transistor.

Throughout the storage device logic and inversion circuits use saturated mode diode-transistor logic configurations to overcome the problem of the high inverse gain factor, and emitter-to-emitter gain factor, of the transistors included in these circuits.

In one particular embodiment according to the present invention the N-P-N collector-diffusion-isolation transistors 11 of the cells have current gain factors of thirty in the forward direction and a current gain factor of ten in the reverse direction. The isolating resistor 15 connected to the base of each transistor 11 is 5 kilohms. The base potential level is raised to +5 volts to render the transistor capable of conducting in either direction. The capacitance 12 of the cell which is charged to store an information bit in the cell is 5 picofarads. The area of the cell in the semiconductor body is $20 \times 10^{-6}$ sq. inch. The time to charge, and to discharge, the capacitance 12 of the cell is 10 nanoseconds. The emitter of the transistor of the cell is raised to a potential level of +5 volts in order to charge the capacitance. A decay of 1 volt across the capacitance 12 takes 200 millisecons at 25° C due to leakage of charge. The access time associated with the cell is of the order of 65 nanoseconds. The average power dissipated by the cell is 250 picowatts. The amplifier 22 has a gain of 100 with a bandwidth of 25 MegaHertz. The pre-bias and reference potential associated with the amplifier are of the order of 0.5 volt. The charges in charged capacitances 12 are restored at the rate of one thousands time per second, and since charges are restored to capacitances in groups of eight the clock pulse frequency is 8 KiloHertz.

The cell construction described above is simple and employs a small amount of the epitaxial layer 30 of the semiconductor body in relation to most other known forms of cell construction.

Thus, it is possible to obtain, with high manufacturing yields, a large number of cells within a semiconductor body. The cell 10 described above is substantially square-shaped in plan profile and hence is suitable to be provided as a regular rectangular array of cells.

The transistor 11 of the cell 10 may comprise any suitable form of bi-directional transistor.

The capacitance 12 of the cell, in which charge is stored to store an information bit in the cell, is required to be connected to zero potential and is also required to be as large as possible. Hence, it is advantageous to have the capacitance connected to the collector of the bi-directional transistor 11 because a large capacitance may then be provided in a convenient manner, and the required connection to a point maintained at zero potential may be provided in a simple way.

What I claim is:

1. A semiconductor information storage device having a plurality of cells each to store an information bit, each cell comprising a bipolar transistor capable of conducting in both the forward and the reverse directions, the transistor having a significant current gain factor in both directions, and a capacitance connected to the collector of the transistor, there being associated with the cell, writing means to charge the capacitance with the transistor conducting in the reverse direction, and reading means to provide an output indicative of the charge state of the capacitance.

2. A semiconductor information storage device as claimed in claim 1 in which switching means is provided to connect selectively the writing means and the reading means to the cell.

3. A semiconductor information storage device as claimed in claim 2 having means to raise the base potential level of the transistor to a value at which the transistor is capable of conducting in either direction, and the switching means connects selectively the writing means and the reading means to the emitter of the transistor.

4. A semiconductor information storage device as claimed in claim 3 in which the transistor is arranged to conduct in the forward direction to discharge the capacitance, when the capacitance is charged, and the reading means is connected to the emitter of the transistor.

5. A semiconductor information storage device as claimed in claim 1 having means in association with the cell by which an information bit stored in the cell periodically is restored.

6. A semiconductor information storage device as claimed in claim 1 in which each cell is formed in a semiconductor body comprising an epitaxial layer of one conductivity type on a substrate of the same conductivity type, the bi-directional transistor of the cell having a collector of the opposite conductivity type comprising both a heavily doped isolation barrier for the transistor and a heavily doped buried layer at the interface between the epitaxial layer and the substrate, the isolation barrier extending through the epitaxial layer into contact with the buried layer, there being formed a P-N junction between the collector and parts of the semiconductor body around the collector and remote from the base, the capacitance of the cell being provided by said P-N junction.

7. A semiconductor information storage device as claimed in claim 1 in which the plurality of cells are formed in a single semiconductor body.

8. A semiconductor information storage device as claimed in claim 7 in which the writing means and the reading means are also formed in the semiconductor body.

9. A semiconductor information storage device having a plurality of cells each to store an information bit, each cell comprising a bipolar collector-diffusion-isolation transistor, the transistor having significant current gain factor in both directions, and a capacitance connected to the collector of the transistor, there being associated with the cell, writing means to charge the capacitance with the transistor conducting in the reverse direction, and reading means to provide an output indicative of the charged state of the capacitance.

10. A semiconductor information storage device as claimed in claim 9 in which switching means is provided to connect selectively the writing means and the reading means to the cell.

11. A semiconductor information storage device as claimed in claim 9 having means to raise the base potential level of the transistor to a value at which the transistor is capable of conducting in either direction, and the switching means connects selectively the writing means and the reading means to the emitter of the transistor.

12. A semiconductor information storage device as claimed in claim 11 in which the transistor is arranged to conduct in the forward direction to discharge the capacitance, when the capacitance is charged, and the reading means is connected to the emitter of the transistor.

13. A semiconductor information storage device as claimed in claim 9 having means in association with the cell by which an information bit stored in the cell periodically is restored.

14. A semiconductor information storage device as claimed in claim 9 in which each cell is formed in a semiconductor body comprising an epitaxial layer of one conductivity type on a substrate of the same conductivity type, the bi-directional transistor of the cell having a collector of the opposite conductivity type comprising both a heavily doped isolation barrier for the transistor and a heavily doped buried layer at the interface between the epitaxial layer and the substrate, the isolation barrier extending through the epitaxial layer into contact with the buried layer, there being formed a P-N junction between the collector and parts of the semiconductor body around the collector and remote from the base, the capacitance of the cell being provided by said P-N junction.

15. A semiconductor information storage device as claimed in claim 9 in which the plurality of cells are formed in a single semiconductor body.

16. A semiconductor information storage device as claimed in claim 15 in which the writing means and the reading means are also formed in the semiconductor body.

* * * * *

PO-1050
(5/69)

UNITED STATES PATENT OFFICE
CERTIFICATE OF CORRECTION

Patent No. 3,818,463 Dated June 18, 1974

Inventor(s) David Latham Grundy

It is certified that error appears in the above-identified patent and that said Letters Patent are hereby corrected as shown below:

On the cover page, insert --[30] Foreign Priority Information - Great Britain 60331/70 filed December 17, 197--.

Signed and sealed this 29th day of October 1974.

(SEAL)
Attest:

McCOY M. GIBSON JR.
Attesting Officer

C. MARSHALL DANN
Commissioner of Patents